(12) United States Patent
Stuttaford et al.

(10) Patent No.: US 7,137,256 B1
(45) Date of Patent: Nov. 21, 2006

(54) METHOD OF OPERATING A COMBUSTION SYSTEM FOR INCREASED TURNDOWN CAPABILITY

(76) Inventors: Peter Stuttaford, 12075 159th Ct. North, Jupiter, FL (US) 33478; Nuria Margarit-Bel, 3200 Islamorada Ct., #105, Palm Beach Gardens, FL (US) 33410; Yan Chen, 612 Moondancer Ct., Palm Beach Gardens, FL (US) 33410; Khalid Oumejjoud, 2809 Amedia Dr., #201, Palm Beach Gardens, FL (US) 33410; Stephen Jennings, 2829 SW. Brighton Way, Palm City, FL (US) 33410

( * ) Notice: Subject to any disclaimer, the term of this patent is extended or adjusted under 35 U.S.C. 154(b) by 0 days.

(21) Appl. No.: 10/906,631

(22) Filed: Feb. 28, 2005

(51) Int. Cl.
   *F02C 9/00* (2006.01)
(52) U.S. Cl. .............................. 60/773; 60/746; 60/747
(58) Field of Classification Search .................. 60/773, 60/733, 734, 737, 739, 740, 746–748
   See application file for complete search history.

(56) References Cited

U.S. PATENT DOCUMENTS

| | | | | |
|---|---|---|---|---|
| 3,949,775 A | * | 4/1976 | Cornell | 137/118.02 |
| 4,027,473 A | * | 6/1977 | Baker | 60/39.281 |
| 4,062,183 A | * | 12/1977 | Davies et al. | 60/39.094 |
| 4,112,676 A | | 9/1978 | DeCorso | |
| 4,903,478 A | * | 2/1990 | Seto et al. | 60/39.281 |
| 4,918,925 A | * | 4/1990 | Tingle | 60/739 |
| 4,928,481 A | * | 5/1990 | Joshi et al. | 60/737 |
| 5,211,005 A | * | 5/1993 | Hovnanian | 60/800 |
| 5,226,287 A | * | 7/1993 | Ng | 60/39.281 |
| 5,303,542 A | * | 4/1994 | Hoffa | 60/773 |
| 5,319,935 A | | 6/1994 | Toon et al. | |
| 5,394,688 A | * | 3/1995 | Amos | 60/39.23 |
| 5,402,634 A | * | 4/1995 | Marshall | 60/776 |
| 5,640,851 A | | 6/1997 | Toon et al. | |
| 5,647,215 A | | 7/1997 | Sharifi et al. | |
| 5,983,642 A | | 11/1999 | Parker et al. | |
| 6,253,555 B1 | | 7/2001 | Willis | |
| 6,513,334 B1 | | 2/2003 | Varney | |
| 6,530,223 B1 | * | 3/2003 | Dodds et al. | 60/746 |
| 6,536,216 B1 | * | 3/2003 | Halila et al. | 60/737 |
| 2002/0043067 A1 | * | 4/2002 | Maeda et al. | 60/776 |
| 2003/0014979 A1 | * | 1/2003 | Summerfield et al. | 60/776 |
| 2003/0106321 A1 | * | 6/2003 | Von Der Bank | 60/776 |
| 2003/0217545 A1 | * | 11/2003 | Parsons et al. | 60/39.281 |
| 2004/0211186 A1 | | 10/2004 | Stuttaford et al. | |
| 2004/0226300 A1 | | 11/2004 | Stuttaford et al. | |

* cited by examiner

*Primary Examiner*—William H. Rodriguez

(57) ABSTRACT

A method of operating a gas turbine engine combustion system at lower load conditions while maintaining required emissions levels is disclosed. The present invention includes multiple embodiments of axial, radial, and circumferential fuel staging within a can-type combustor having alternate ignition techniques of spark ignition or torch ignition.

11 Claims, 6 Drawing Sheets

METHOD OF OPERATING A COMBUSTION SYSTEM FOR INCREASED TURNDOWN CAPABILITY

BACKGROUND OF THE INVENTION

This invention relates in general to gas turbine combustion systems and specifically to a method of operating a gas turbine combustion system at significantly lower load conditions while having stable combustion and lower emissions.

Gas turbine engines typically include a compressor, one or more combustors each having a fuel injection system, and a turbine section. In an engine having a plurality of combustors, they are typically arranged in an annular array about the engine and most typically interconnected for the purposes of ignition. The compressor raises the pressure of inlet air, and then directs it to the combustors, where it is used to cool the combustion chamber walls as well to provide air for the combustion process. In the combustion chamber, compressed air is mixed with a fuel and the mixture is ignited by an ignition source to produce hot combustion gases. Typically, ignition occurs within a single chamber, and for engines with multiple combustors, the flame passes through tubes interconnecting the combustors to ignite the fuel air mixture in the adjacent combustor. This process continues around the engine until fuel-air mixtures in all combustors have been ignited. The hot gases resulting from the combustion process are then directed to drive a turbine. For land-based gas turbines, whose primary purpose is to generate electricity, a generator is coupled to the turbine shaft such that the turbine drives the generator.

While a full load condition is the most common operating point for land-based gas turbines used for generating electricity, often times electricity demands do not require the full load of the generator, and the operator desires to operate the engine at a lower load setting, such that only the load demanded is produced, thereby saving fuel costs. Combustion systems of the prior art have been known to become unstable at lower load settings while also producing unacceptable levels of carbon monoxide (CO) and oxides of nitrogen (NOx) at these lower load settings, especially below 50% load. This is primarily due to the fact that most combustion systems are staged for most efficient operation at high load settings and therefore operate less efficiently at lower load settings. Furthermore, it is well known in the art of combustion that lower emissions are achieved through premixing air and fuel together prior to combustion, instead of through diffusion, and therefore premixing is the preferred method of combustion for highest efficiency and lowest emissions. However, advancements have been made with regards to fuel staging in an effort to lower emissions. For example, U.S. Pat. No. 5,551,228 discloses a method of operating a combustor involving assymetrical fuel staging within a combustor and axially staging fuel injection within a single fuel nozzle for reducing emissions. Furthermore, U.S. Pat. No. 5,924,275 discloses a method of operating a combustor that utilizes the addition of a center pilot nozzle in combination with the previously mentioned assymetrical fuel staging to provide reduced emissions at lower load conditions. While this staging method and combustor configuration is an enhancement, it is still limited in turndown capability, such that in order to achieve turndown to low, part-load settings, the combustor must often revert to the higher emissions diffusion mode and not operate in the lower emissions premix mode. An effort to overcome the shortcomings of the prior art was disclosed by co-pending U.S. patent application Ser. No. 10/437,748 assigned to the same assignee as the present invention. However, this prior patent application for staging fuel to produce low emissions at low load settings was directed to a combustor configuration having a can-annular configuration in which adjacent combustors communicated with each other via crossfire tubes.

The combination of potentially unstable combustion and higher emissions often times prevents engine operators from running engines at lower load settings, forcing the engines to either run at higher settings, thereby burning additional fuel, or shutting down, and thereby losing valuable revenue that could be generated from the part-load demand. A further problem with shutting down the engine is the additional cycles that are incurred by the engine hardware. A cycle is commonly defined as the engine passing through the normal operating envelope and thereby exposing the engine hardware to a complete cycle of pressures and temperatures that over time cause wear to the engine hardware. Engine manufacturers typically rate hardware life in terms of operating hours or equivalent operating cycles. Therefore, incurring additional cycles can reduce hardware life requiring premature repair or replacement at the expense of the engine operator.

What is needed is a system that can provide flame stability and low emissions benefits throughout the full operating conditions of the gas turbine engine for a combustion system in a can orientation, including a low part-load condition. This system should be one that can be efficiently operated at lower load conditions, thereby eliminating the wasted fuel when high load operation is not demanded or incurring the additional cycles on the engine hardware when shutting down.

SUMMARY OF THE INVENTION

The present invention seeks to overcome the shortfalls of the prior art by providing a method of operating a combustion system that provides stable combustion having low NOx and CO emissions throughout all load conditions. This is accomplished through a plurality of fuel stages, including axial, radial, and circumferential staging.

In the preferred embodiment of the present invention, the combustion system includes a plurality of injectors staged radially, axially, and circumferentially. A can combustion system is provided comprising a plurality of first stage injectors arranged in a first array about a center axis and a plurality of second stage injectors arranged in a second array radially outward of the first array and proximate a first swirler. The combustion system also comprises an aft injector assembly having a manifold, which is located axially downstream of the end cover and radially outward of the liner. In the preferred embodiment, the manifold of the aft injector assembly comprises a plurality of third stage injectors and a plurality of fourth stage injectors, each of which are arranged in sectors with the plurality of third stage injectors encompassing approximately one third of the aft injector assembly while the plurality of fourth stage injectors encompass the remaining two thirds of the aft injector assembly. For this preferred embodiment, a spark ignition source is utilized to ignite the fuel and air mixture within each combustor.

In an alternate embodiment of the present invention, the plurality of first stage injectors are repositioned to the aft injector assembly such that the plurality of first stage injectors, plurality of third stage injectors, and plurality of fourth stage injectors each encompass approximately one third of the aft injector assembly. This repositioning of the plurality of first stage injectors is necessary if an alternate form of ignition, a torch igniter, is utilized. A torch igniter, which is a more reliable form of ignition due to its dedicated fuel source, may be necessary depending on the operating conditions. If a torch igniter is selected, then the fuel supplied by the plurality of first stage injectors is not necessary for ignition and is restaged such that it is premixed instead via the aft injector assembly. The combustion system disclosed in the present invention contains both a spark igniter and torch igniter for redundancy and operator choice.

The present invention discloses an operating sequence for each of the four fuel stages identified such that emissions are kept within required levels while operating reliably at low load conditions. This is accomplished initially at combustor ignition by supplying fuel to plurality of first stage injectors and plurality of second stage injectors and gradually increasing fuel flow split to the plurality of first stage injectors and decreasing fuel flow split to plurality of second stage injectors until all fuel flows through plurality of first stage injectors at an engine full speed no load condition. Fuel flow split to the plurality of first stage injectors is maintained until a first part-load condition. Fuel flow split then gradually decreases to the plurality of first stage injectors while gradually increasing the fuel flow split to a plurality of second stage injectors until all fuel injected into the combustion system is directed through the plurality of second stage injectors at a second part load condition and maintaining all fuel flow to the plurality of second stage injectors until a third part load condition. At this third part load condition, fuel flow split to the plurality of second stage injectors is reduced while fuel flow split the plurality of third stage injectors is increased. Then, fuel flow split is further decreased to the plurality of second stage injectors and further increased to the plurality of third stage injectors up to a fourth part load condition. At the fourth part load condition, reducing fuel flow split to both the plurality of second stage injectors and plurality of third stage injectors while increasing fuel flow split to the plurality of fourth stage injectors. Fuel flow split to each of the plurality of second, third, and fourth stage injectors is then maintained until the gas turbine engine reaches a full load condition.

It is through axial, radial, and circumferential fuel staging described herein that low emissions and stable combustion is maintained throughout all points of the engine operating cycle. By decreasing fuel flow split to active injectors when additional injectors are started, emissions levels are controlled. At the first part-load condition, when only first and second injectors are operating, flame temperature will tend to be higher due to the locally high operating fuel/air ratio. As a result, the higher flame temperature precludes the release of CO while assuring a stable flame at the first part-load condition. As load increases, fuel flow split to the pilot region proximate the igniter is reduced and additional fuel-air mixing is accomplished from the aft injector assembly.

In accordance with these and other objects, which will become apparent hereinafter, the instant invention will now be described with particular reference to the accompanying drawings.

DETAILED DESCRIPTION OF THE PREFERRED EMBODIMENT

Figure 1:
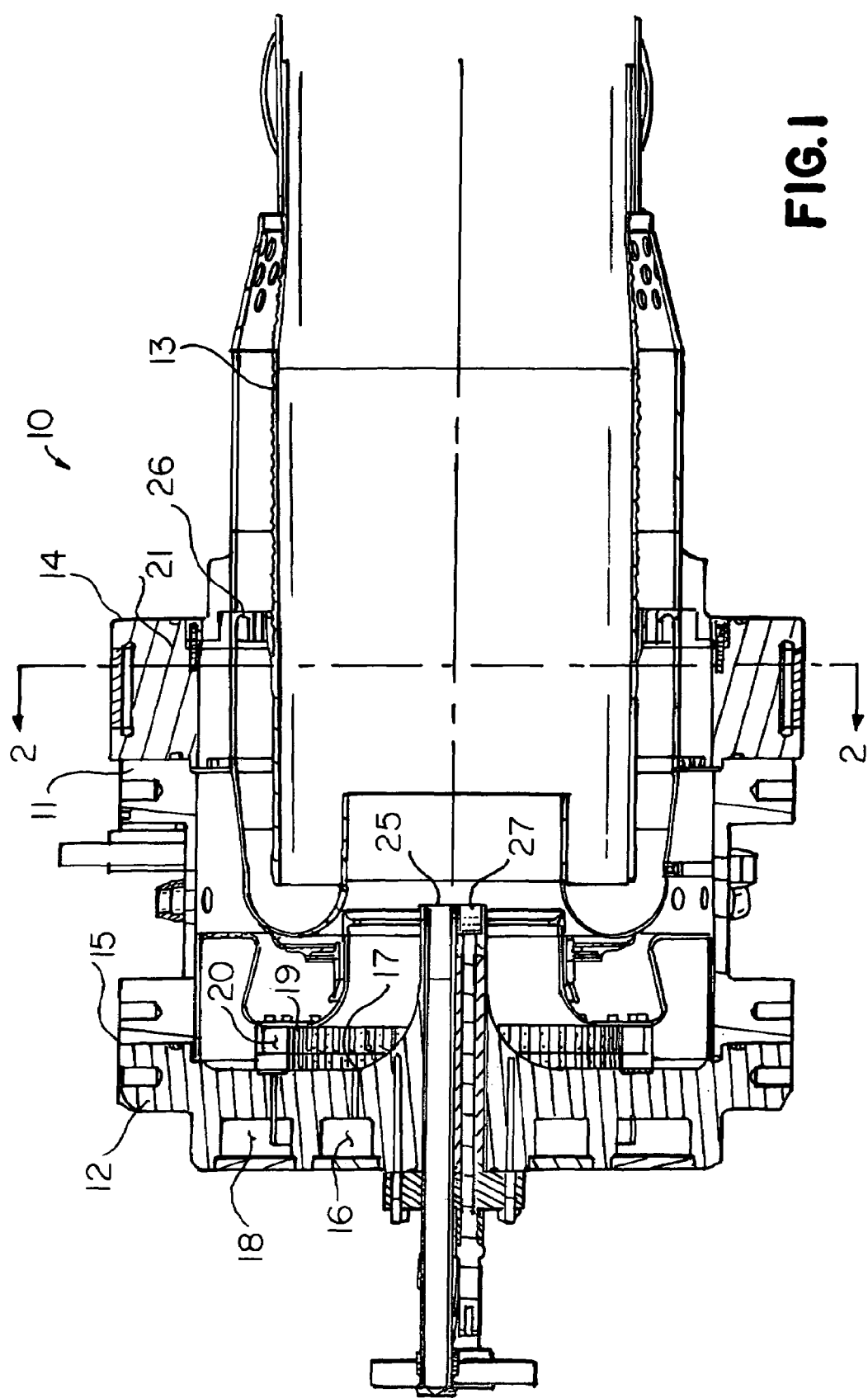
FIG. 1 is a cross section of a combustion system that operates in accordance with the preferred embodiment of the present invention.

Referring to FIG. 1, a combustion system 10 for a gas turbine engine is shown in cross section. Combustion system 10 comprises casing 11, end cover 12, combustion liner 13, and a center axis A—A. Casing 11, which is mounted to an engine through flange 14, is in fluid communication with compressed air from a compressor. An end cover 12 is fixed to casing first end 15, with end cover 12 having at least one fuel source in fluid communication with at least one set of injectors. In the preferred embodiment a first fuel source 16 is in fluid communication with a plurality of first stage injectors 17, where plurality of first stage injectors 17 are arranged in a first array about center axis A—A. Furthermore, the preferred embodiment of end cover 12 also contains a second fuel source 18 in fluid communication with a plurality of second stage injectors 19, where plurality of second stage injectors 19 are arranged in a second array radially outward of first stage injectors 17 proximate a first swirler 20.

Figure 2:
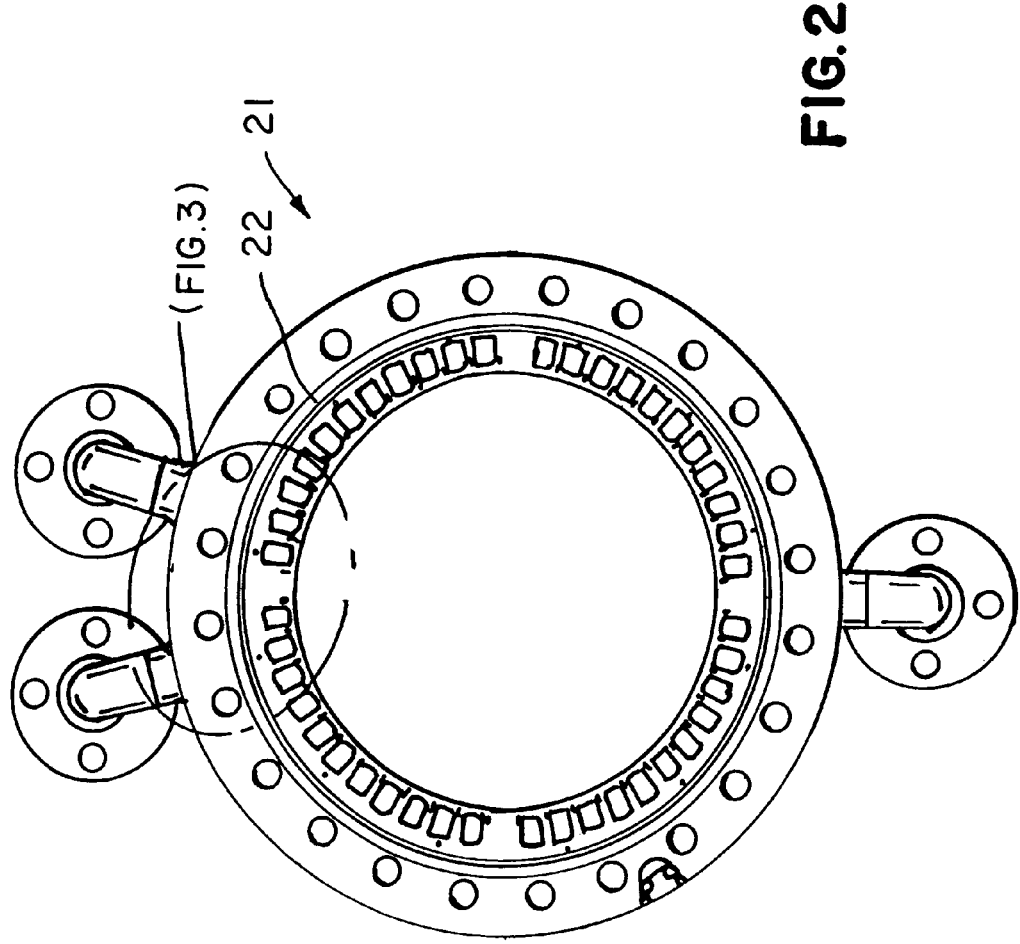
FIG. 2 is a cross section taken through a portion of the combustion system of FIG. 1 in accordance with the preferred embodiment of the present invention.
Figure 3:
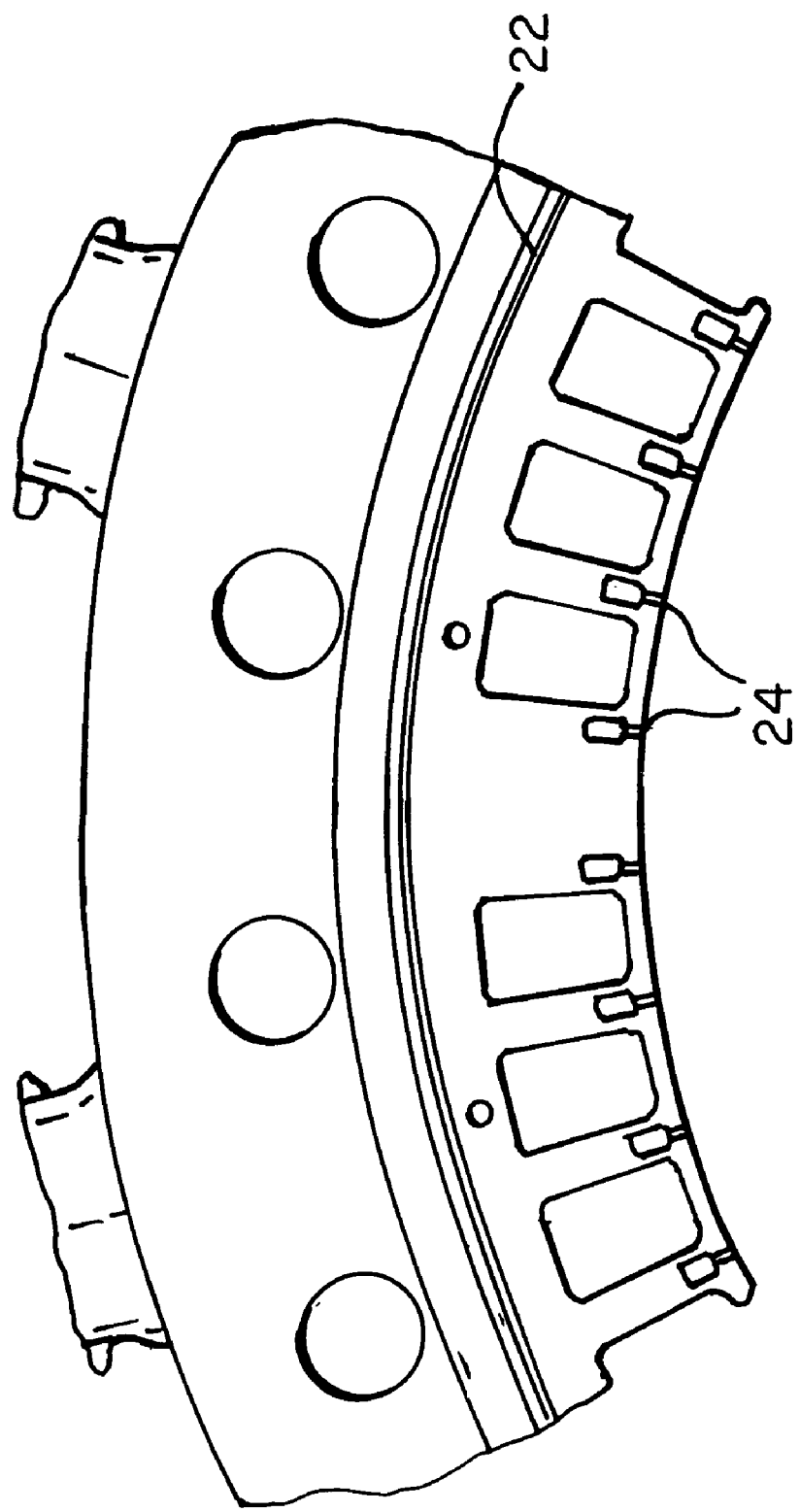
FIG. 3 is a detailed view of a portion of the aft injector assembly in accordance with the preferred embodiment of the present invention.
Figure 4:
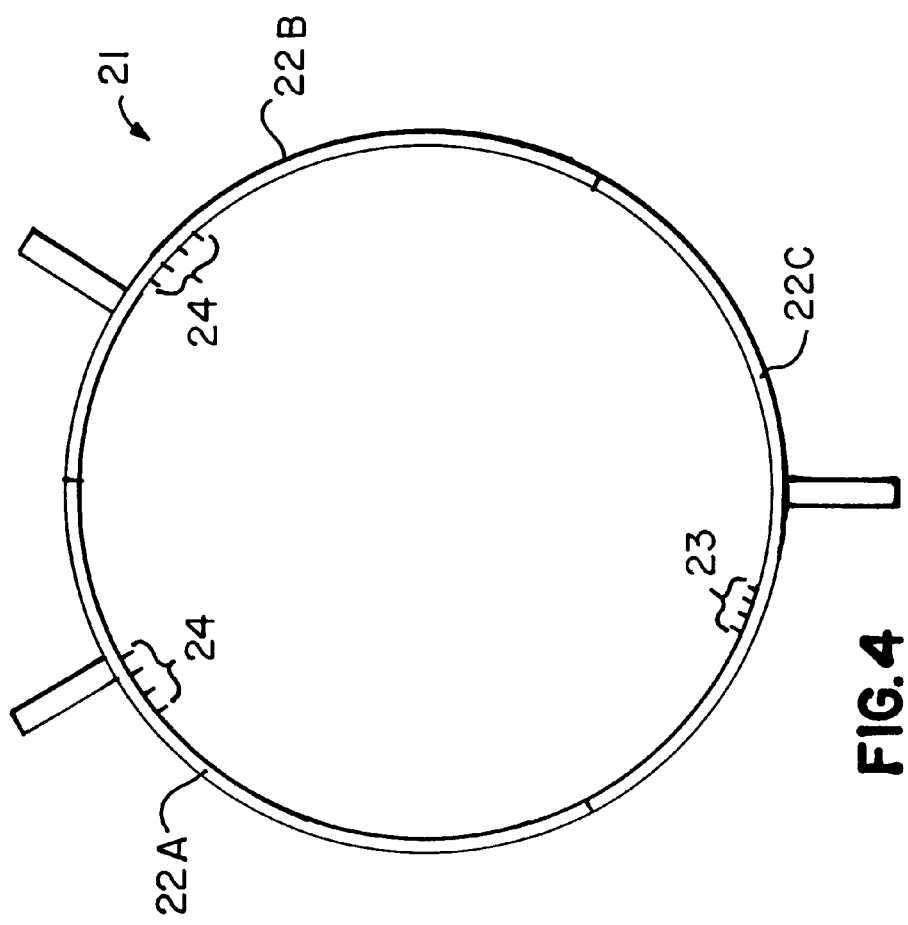
FIG. 4 is a cross section schematic representative of the aft injector assembly in accordance with the preferred embodiment of the present invention.

The combustion system of the present invention further comprises an aft injector assembly 21, which is shown in FIG. 1 and in cross section in FIGS. 2 and 3. Aft injector assembly 21 comprises a manifold 22 having a plurality of third stage injectors 23 and a plurality of fourth stage injectors 24. Third stage injectors 23 and fourth stage injectors 24 are arranged in sectors in aft injector assembly 21. These sectors are better understood with reference to FIG. 4, which is a schematic cross section view of aft injector assembly 21. Manifold 22 of aft injector assembly 21 is divided into three sectors 22A, 22B, and 22C. For the preferred embodiment, in which plurality of first stage injectors and plurality of second stage injectors inject fuel from end cover 12 and ignition of the fuel-air mixture results from a spark ignition source 25, sector 22C contains plurality of third stage injectors 23 while sectors 22A and 22B contain plurality of fourth stage injectors 24. In this configuration, plurality of third stage injectors 23 encompass approximately one-third of manifold 22 in aft injector assembly 21 while plurality of fourth stage injectors 24 encompass the remaining approximately two-thirds of manifold 22. Each sector, 22A, 22B, and 22C contain a separate fuel inlet location for supplying fuel to the sector, where for the preferred embodiment, fuel to sectors 22A and 22B are supplied from the same source so that each fourth stage injector 24 receives a uniform fuel flow split. The exact quantity and size of injectors 23 and 24 depends on the desired fuel flow split and mixing and is at the discretion of the combustion designer. To further mix the fuel from aft injector assembly 21 with the surrounding compressor air, combustion system 10 further comprises a second swirler 26 adjacent aft injector assembly 21.

Figure 5:
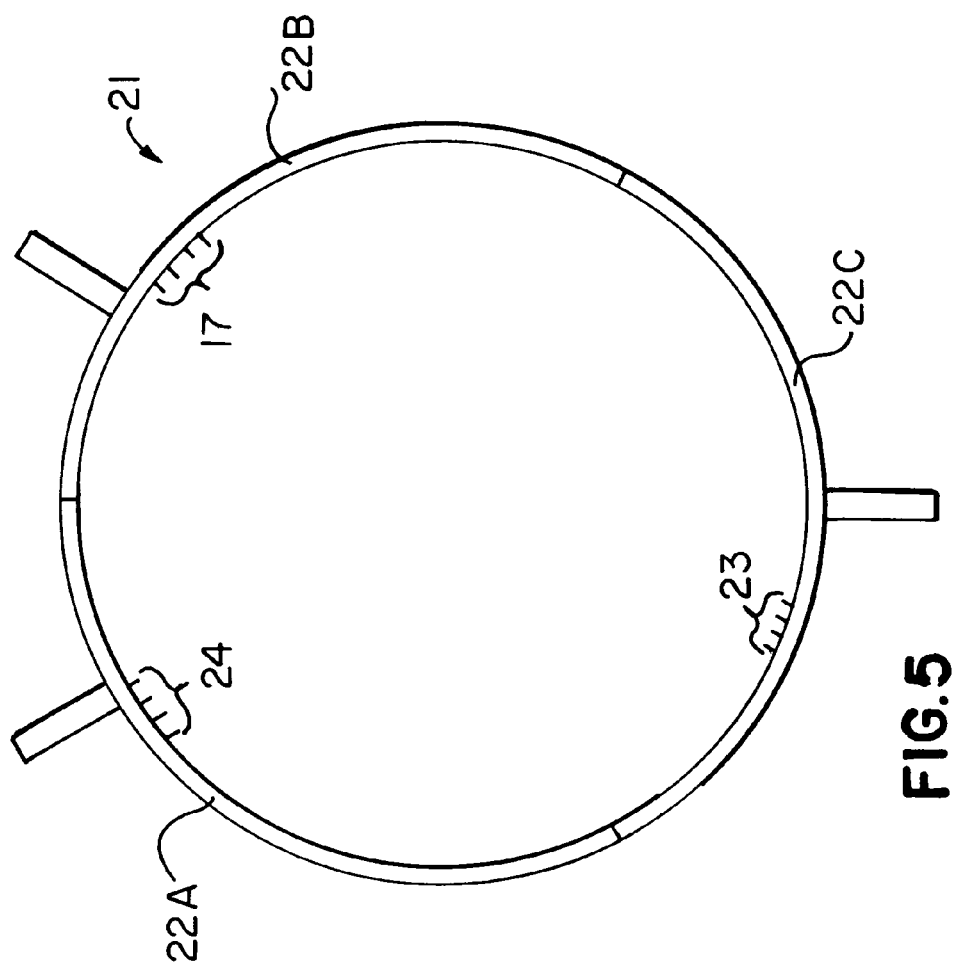
FIG. 5 is a cross section schematic representative of the aft injector assembly in accordance with an alternate embodiment of the present invention.

In an alternate embodiment of the present invention, all of the features of the preferred embodiment of the present invention are utilized except for the ignition source, and as a result, the placement of the plurality of first stage injectors 17. In the event that a more reliable ignition source, such as a torch igniter, is desired, then the fuel injection from plurality of first stage injectors 17 proximate centerline A—A is not necessary since, by design, a torch igniter includes a dedicated fuel source for ignition. Referring back to FIG. 1, torch igniter 27 is located proximate center axis A—A, similar to that of the spark igniter 25 of the preferred embodiment. In this alternate embodiment, which is shown schematically in FIG. 5, plurality of first stage injectors 17 are repositioned to aft injector assembly 21 in sector 22B of manifold 22. By dividing manifold 22 into three sectors, each encompassing approximately one-third of manifold 22, it allows for easy repositioning of the plurality of first stage injectors by simply changing the first stage fuel inlet location from end cover 12 to aft injector assembly 21 without requiring any other major hardware changes, should that change be necessary or desirable. Repositioning plurality of first stage injectors 17 to aft injector assembly 21, not only is a relatively simple adjustment to make, but also allows greater flexibility for staging fuel injection through the aft injector assembly.

Figure 6:
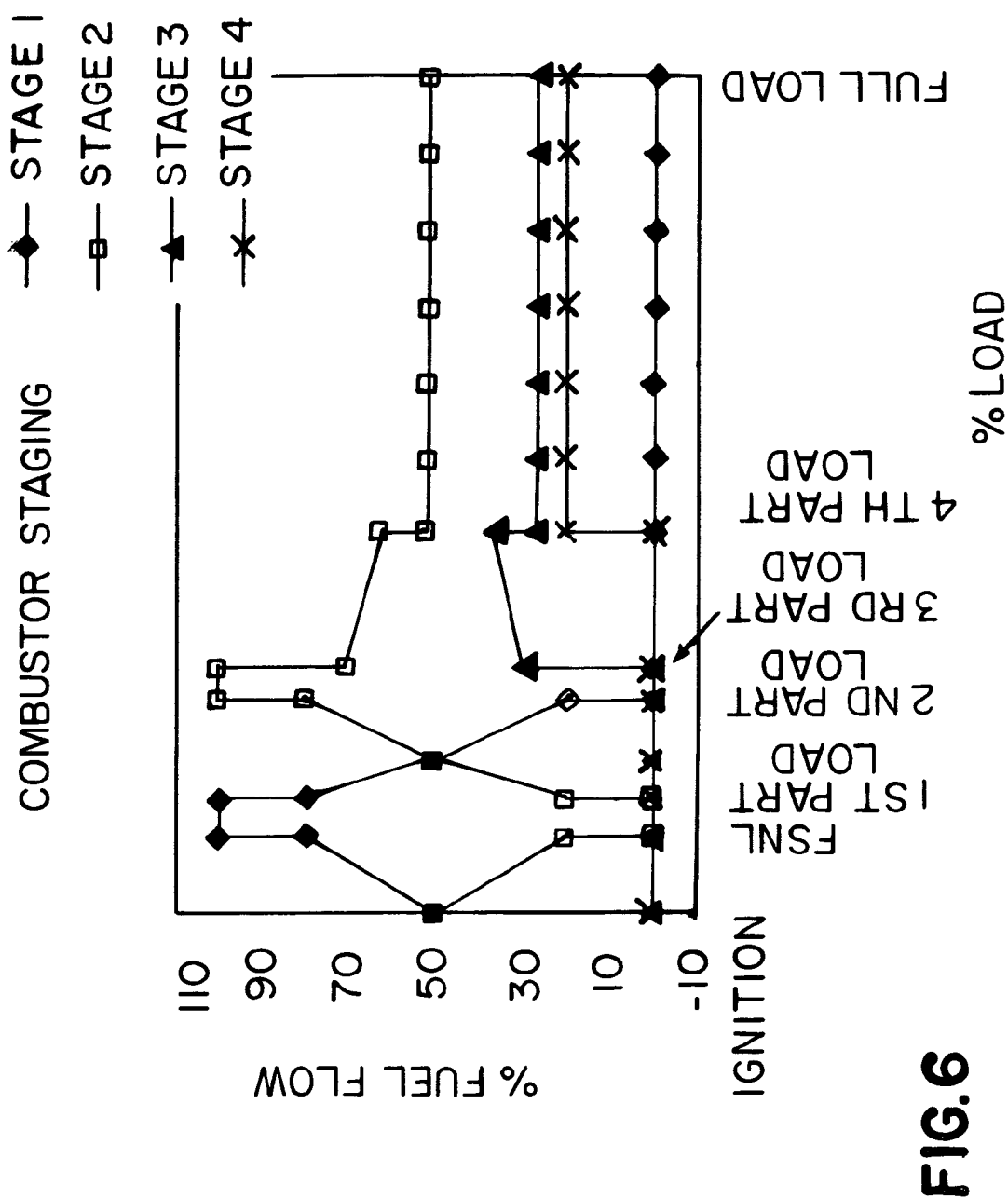
FIG. 6 is a diagram depicting fuel flow split rates for each stage of fuel injectors as a function of engine condition for the preferred embodiment of the present invention.

Referring now to FIG. 6, the method of operation of the combustion system previously described is disclosed. In operation, a fuel, preferably natural gas, is supplied to plurality of first stage injectors 17 and plurality of second stage injectors 19 so as to inject the fuel into a surrounding air flow to form a mixture. This mixture is then ignited by the ignition source, which for the preferred embodiment is a spark igniter. Once ignition is achieved, fuel flow split gradually increases to plurality of first stage injectors 17 and gradually decreases to plurality of second stage injectors 19 until all fuel to combustion system 10 is flowing through plurality of first stage injectors 17 at an engine full speed no load condition. Once at the full speed no load condition, fuel flow split to plurality of first stage injectors 17 is maintained until a first part load condition is achieved. At the first part load condition, fuel flow split to plurality of first stage injectors 17 gradually decreases while fuel flow split to plurality of second stage injectors 19 is reinitiated and gradually increases until all fuel to combustion system 10 is flowing through plurality of second stage injectors 19 at a second part load condition. Once at a second part load condition, fuel flow split to plurality of second stage injectors 19 is maintained until a third part load condition is achieved. At the third part load condition, fuel flow split to plurality of second stage injectors 19 is reduced while simultaneously directing flow to and increasing fuel flow split to plurality of third stage injectors 23. Once fuel is flowing through both plurality of second stage injectors 19 and plurality of third stage injectors 23, fuel flow split to plurality of second stage injectors 19 further decreases while fuel flow split plurality of third stage injectors 23 continues to increase until a fourth part load condition is achieved. At the fourth part load condition, fuel flow split to both plurality of second stage injectors 19 and third stage injectors 23 is reduced while directing fuel to flow through the plurality of fourth stage injectors 24 and increasing the fuel flow split to plurality of fourth stage injectors 24. From this point, with fuel flowing through plurality of second stage injectors 19, plurality of third stage injectors 23, and plurality of fourth stage injectors 24, fuel flow split is maintained until the gas turbine engine reaches a full load condition.

For the staged fuel injection configurations outlined by both the preferred and alternate embodiments, NOx and CO emissions are maintained within regulated parameters. This is accomplished by increasing and decreasing fuel flow split rates to each stage as required to support the required load condition, while not burning the fuel air mixture at a high enough temperature to generate excessive NOx nor quenching the flame to produce higher than desired CO levels. The method of the present invention describes a combustion system operation that can provide flame stability and low emissions benefits throughout the full operating conditions of the gas turbine engine, including a low part-load condition. Therefore, the gas turbine can be operated efficiently at lower load conditions, thereby eliminating wasted fuel when high load operation is not demanded or incurring the additional cycles on the engine hardware when shutting down.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What is claimed is:

1. A method of operating a combustion system of a gas turbine engine, said method comprising:
   a). providing a combustion system comprising a plurality of first stage injectors arranged in a first array about a center axis, a plurality of second stage injectors arranged in a second array radially outward of said first injectors proximate a first swirler, an aft injector assembly comprising a manifold having a plurality of third stage injectors and a plurality of fourth stage injectors, said plurality of third stage and fourth stage injectors arranged in sectors of said aft injector assembly, and a spark ignition source located within said combustion system;
   b). supplying a fuel to said plurality of first stage injectors and said plurality of second stage injectors at a fuel flow split and injecting said fuel into a surrounding air flow to form a mixture, and igniting said mixture with said spark ignition source;
   c). gradually increasing fuel flow split to said plurality of first stage injectors while gradually decreasing fuel flow split to said plurality of second stage injectors until all fuel to said combustion system is flowing through said plurality of first stage injectors at engine full speed no load condition;
   d). maintaining said fuel flow split to said plurality of first stage injectors until a first part-load condition;
   e). at said first part-load condition, gradually decreasing said fuel flow split to said plurality of first stage injectors while gradually increasing said fuel flow split to said plurality of second stage injectors until all fuel to said combustion system is flowing through said plurality of second stage injectors at a second part-load condition;
   f). maintaining said fuel flow split to said plurality of second stage injectors until a third part-load condition;
   g). at said third part-load condition, reducing said fuel flow split to said plurality of second stage injectors while increasing fuel flow split to said plurality of third stage injectors;
   h). gradually decreasing said fuel flow split to said plurality of second stage injectors while gradually increasing said fuel flow split to said plurality of third stage injectors until a fourth part load condition;

i). At said fourth part load condition, reducing said fuel flow split to both said plurality of second stage injectors and said plurality of third stage injectors while increasing fuel flow split to said plurality of fourth stage injectors; and, j). maintaining said fuel flow split to said plurality of second stage, third stage, and fourth stage injectors until said gas turbine engine reaches a full load condition.

2. The method of claim 1 wherein NOx emissions are controlled as total combustor fuel flow increases by reducing fuel flow split to the previously activated injector.

3. The method of claim 1 wherein said gas turbine combustion system further comprises a second swirler adjacent said aft injector assembly.

4. The method of claim 1 wherein said plurality of third stage injectors is oriented in a sector encompassing approximately one third of said aft injector assembly manifold.

5. The method of claim 4 wherein said plurality of fourth stage injectors is oriented in a sector encompassing approximately two thirds of said aft injector assembly manifold.

6. A method of operating a combustion system of a gas turbine engine, said method comprising:
   a). providing a combustion system comprising a plurality of second stage injectors arranged in an array about a center axis proximate a first swirler, an aft injector assembly comprising a manifold having a plurality of first stage injectors, a plurality of third stage injectors, and a plurality of fourth stage injectors, said plurality of first stage, third stage, and fourth stage injectors arranged in sectors of said aft injector assembly, and a torch ignition source located within said combustion system;
   b). supplying a fuel to said plurality of first stage injectors and said plurality of second stage injectors at a fuel flow split and injecting said fuel into a surrounding air flow to form a mixture, and igniting said mixture with said torch ignition source;
   c). gradually increasing fuel flow split to said plurality of first stage injectors while gradually decreasing fuel flow split to said plurality of second stage injectors until all fuel to said combustion system is flowing through said plurality of first stage injectors at engine full speed no load condition;
   d). maintaining said fuel flow split to said plurality of first stage injectors until a first part-load condition;
   e). at said first part-load condition, gradually decreasing said fuel flow split to said plurality of first stage injectors while gradually increasing said fuel flow split to said plurality of second stage injectors until all fuel to said combustion system is flowing through said plurality of second stage injectors at a second part-load condition;
   f). maintaining said fuel flow split to said plurality of second stage injectors until a third part-load condition;
   g). at said third part-load condition, reducing said fuel flow split to said plurality of second stage injectors while increasing fuel flow split to said plurality of third stage injectors;
   h). gradually decreasing said fuel flow split to said plurality of second stage injectors while gradually increasing said fuel flow split to said plurality of third stage injectors until a fourth part load condition;
   i). At said fourth part load condition, reducing said fuel flow split to both said plurality of second stage injectors and said plurality of third stage injectors while increasing fuel flow split to said plurality of fourth stage injectors; and,
   j). maintaining said fuel flow split to said plurality of second stage, third stage, and fourth stage injectors until said gas turbine engine reaches a full load condition.

7. The method of claim 6 wherein NOx emissions are controlled as total combustor fuel flow increases by reducing fuel flow split to the previously activated injector.

8. The method of claim 6 wherein said gas turbine combustion system further comprises a second swirler adjacent said aft injector assembly.

9. The method of claim 6 wherein said plurality of first stage injectors is oriented in a sector encompassing approximately one third of said aft injector assembly manifold.

10. The method of claim 9 wherein said plurality of third stage injectors is oriented in a sector encompassing approximately one third of said aft injector assembly manifold.

11. The method of claim 10 wherein said plurality of fourth stage injectors is oriented in a sector encompassing approximately one third of said aft injector assembly manifold.

* * * * *